Aug. 7, 1956  R. A. WILSON ET AL  2,757,603
BALING MACHINES
Filed Sept. 15, 1953  3 Sheets-Sheet 1

Inventors
JOHN NORMAN BARLOW
& ROBERT ALEXANDER WILSON
BY
Attorney

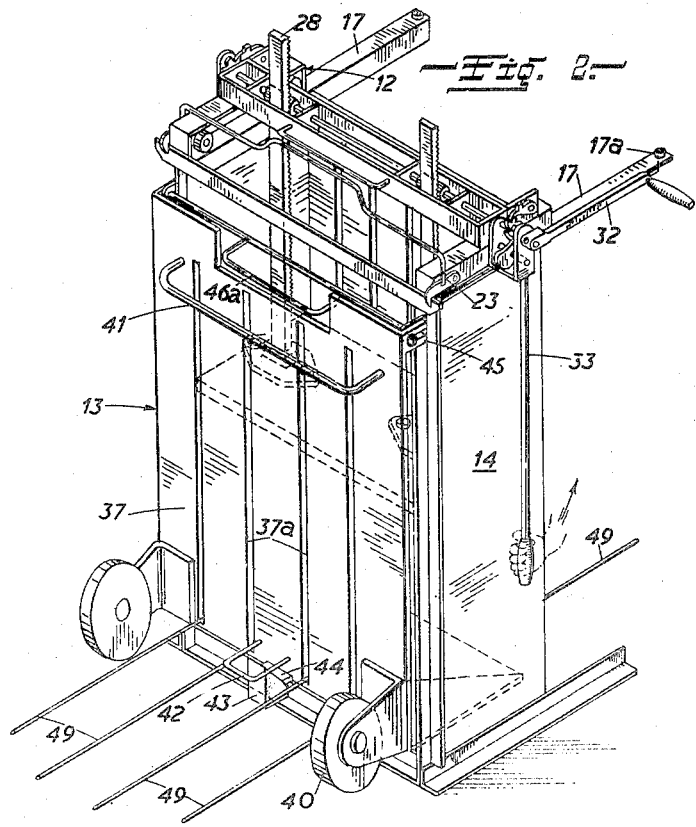
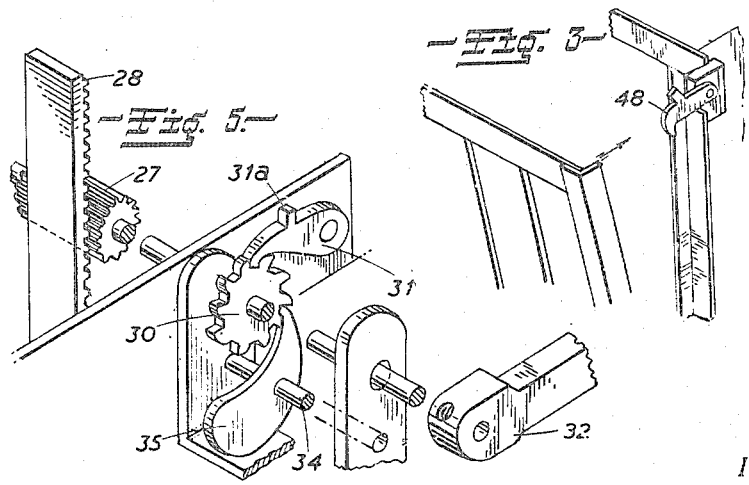

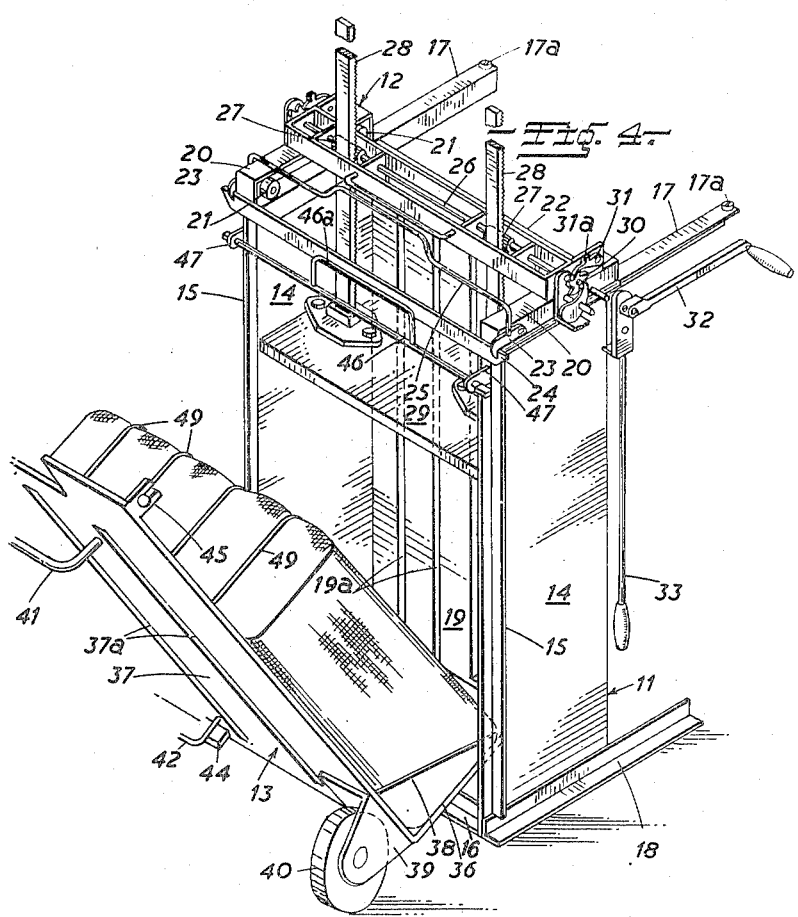
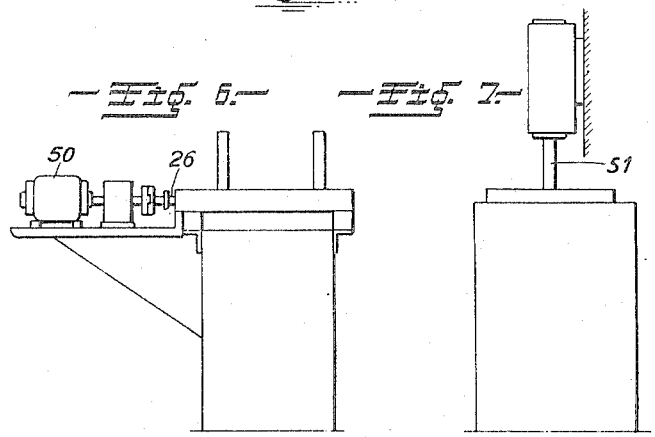

United States Patent Office 2,757,603
Patented Aug. 7, 1956

2,757,603

BALING MACHINES

Robert Alexander Wilson, Chorlton-on-Medlock, Manchester, and John Norman Barlow, Withington, Manchester, England, assignors, by mesne assignments, to Portable Balers Limited, Birmingham, England, a British company Application September 15, 1953, Serial No. 380,256

Claims priority, application Great Britain September 16, 1952

8 Claims. (Cl. 100—226)

This invention concerns baling machines, particularly, but not exclusively, for baling rags, paper and metal foil.

The principal object of the present invention is to provide a baling machine which substantially reduces the time and effort involved in removing finished bales from the machine and in subsequent handling and transport thereof.

According to the present invention a baling machine includes a mobile truck which is adapted to support material to be baled within the machine during a pressing operation, and also during wiring or like operations, if desired, and which is quickly detachable to allow the pressed bale to be removed whilst still supported thereby.

The invention will now be described further, by way of example, with reference to the accompanying drawings, in which:

Fig. 2 is a perspective view of the baling machine of Fig. 1 during compression of the bale material;

Fig. 3 is a fragmentary perspective detail view showing an alternative construction of certain parts;

Fig. 4 is a fragmentary perspective view of the baling machine of Fig. 1 showing the finished bale being removed;

Fig. 5 is an exploded detail view of a handle and rack and pinion for operating the press head of the press shown in Figs. 1–4;

Fig. 6 is a diagrammatic front elevation of a baling machine, constructed in accordance with the invention, and illustrating an electrical mode of operation, and Fig. 7 is a diagrammatic and elevation of a baling machine, constructed in accordance with the invention, and illustrating fluid pressure operating means therefor.

Figure 1:
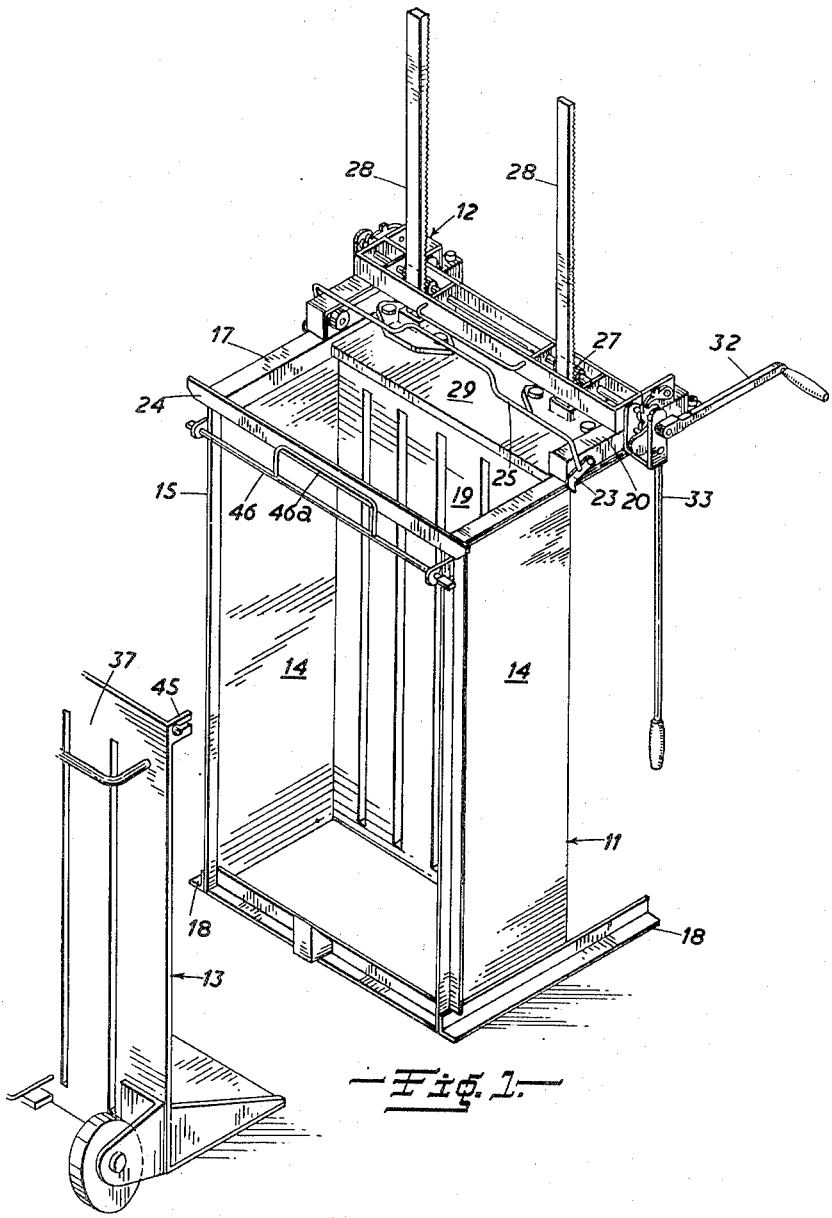
Fig. 1 is a fragmentary perspective view of a baling machine, constructed in accordance with the invention, before baling commences.

Referring to Figs. 1–5 a baling machine consists basically of a body 11, a retractable top 12, and a truck 13.

The body 11 is fabricated from sheet metal and angle iron and is of robust construction. It has two narrow sides 14 of sheet metal welded or riveted to vertical angle iron front corner members 15 joined at their bottom ends by a further angle iron 16. The top edge of each narrow side has secured thereto an angle iron 17 extending rearwardly of the body, and the bottom edges also are each provided with an angle iron 18 which extends beyond the rear of the body to afford support therefor when the top, which is carried by angle irons 17, is retracted up to the stops 17a. The rear 19 of the body is likewise of sheet metal, being formed by a panel extending between and welded to the rear edges of the sides 14. The rear 19 is provided at intervals with vertical slots 19a for a purpose to be described hereinafter.

The top 12 comprises two boxes 20 one at each side, each having a wheel or roller 21 rotatably journalled internally thereof at the front and rear. The boxes 20 are spaced apart by a bridge 22 secured by its ends centrally of the upper surfaces thereof so that the wheels 21 are supported on the respective upper webs of the angle irons 17. The lower web of each box 20 is folded beneath the upper web of the respective angle iron 17 to withstand the upward reaction of the top when pressure is applied to the bale. The top is retained in its forward, operative position by hooks 23 which then engage with a bar 24 secured across the front of the body 11 at a suitable height. The hooks 23 are joined by a transverse rail 25 whereby they may be lifted or dropped simultaneously. The bridge 22 serves to carry a shaft 26 transversely of the top 12. Fitted to the shaft near each end thereof is a pinion 27 engaging with a rack 28. The racks 28 carry at their lower ends a press plate 29 and together constitute a press head. At either end the shaft 26 is journalled in the wall of the bridge 22, extends therethrough, and carries a ratchet wheel 30. A pawl 31 is pivotally attached to a rearward extension of the wall of the bridge 22 and is adapted to engage the ratchet wheel 30 in one direction of its movement with its end, and in the other direction of its movement with a lug 31a thereon. The extreme ends of the shaft 26 are each fitted with a short handle 32 and a long handle 33. Each short handle 32 is keyed or otherwise locked to the shaft 26 so that the latter revolves to activate the press head when the handle 32 is turned. Each long handle 33 has a forked end which is free on the shaft 26, and carries on a spindle 34 a pawl 35 adapted in one direction of its movement to engage the ratchet wheel 30 with its end (Fig. 5). Suitable means (not shown) such as a spring may be provided for causing the pawl 35 to be held either in or out of engagement with the ratchet wheel 30.

The truck 13 is also robustly constructed from sheet metal, having a base 36 of length somewhat less than the distance from back to front of the body 11 and a back 37, of height somewhat less than the height of the body 11. At each side of the truck 13, in the angle between the base 36 and the back 37 is a triangular gusset 38. The back 37 has slots 37a corresponding with the slots 19a in the rear 19 of the body 11. At the bottom outside surface of the back 37, at each side, is fitted a bracket 39 which constitutes a mounting for a wheel 40. A handrail 41 and footrest 42 are provided respectively at the top and bottom outer surface of the back 37. To the front base of the body 11 is attached a guide block 43 which is adapted to guide a plate 44 on the back 37 of the truck 13 so as to locate the base of the truck in position relative to the body (Fig. 2). The upper end of the back 37 has a pair of side lugs 45 slotted and bored to accept the flattened ends of a rail 46 held in side lugs 47 on the body 11. A central handle 46a is provided for pivoting the rail 46 until the flattened ends after they have passed through the slotted portions of the side lugs 45 move into the vertical position within the bored portions of the side lugs 45, the upper part of the truck 13 being then firmly held in position relative to the body 11. In an alternative arrangement (see Fig. 3) instead of side lugs 45, rail 46, and side lugs 47, a pair of hooks 48 are pivotally supported, one at each side of the front top of the body 11. The upper edge of the truck is shaped automatically to engage the hooks as the truck is placed in position.

In operation, baling of material such as rags is carried out as follows. After the previous bale has been removed the truck 13 is left detached from the body 11, and the top 12 released and rolled back (Fig. 1). The first step in the preparation of the next bale is to reposition the truck in the body. Another similar truck of course may be used if the truck on which the previous bale was prepared is utilised for transporting said bale to a loading or other station which is one of the important advantages of the invention. This is done by rolling the truck 13 up to the body 11 on its wheels 40, in a backwardly tilted position, until the base 36 enters between the sides 14 and is enclosed. As the truck is then tilted forward the plate 44 rides down the inclined face of the guide block 43 and the flatted ends of the rail 46, which remain horizontally orientated after release of the truck to remove the previous bale, pass through the slotted portions of the side lugs 45 and enter the bored portions thereof. The rail 46 is then turned down by the hand rail 46a and the truck is held firmly in position both at its top and bottom.

The next step is to feed rags through the open top of the machine until a substantial quantity are supported on the truck base 36 and enclosed by the sides 14 and back 19 of the body 11, and the back 37 of the truck. If it is desired that the compressed bale be wired before removal then wires 49 are first placed in position along the base 36 of the truck and passed through the slots 19a and 37a.

The top 12 is then rolled forwardly on its wheels 21 and the hooks 23 engaged over the bar 24 by means of the rail 25. The hooks, of course, may be adapted for automatic engagement, in which case the rail 25 need only be manipulated for release purposes. The press head, which has been in the retracted position to allow back and forth movement of the top 12, is then quickly wound down by turning a short handle 32 (so operating the racks and pinions) until the press plate 29 contacts the rags. During this movement the pawls 31 engage the rachets 30 by their ends and therefore slip, during downward movement of the press head, but prevent the weight of the short handles 32 causing retraction of the press head should they come to rest in a rearwardly extending substantially horizontal position. The press head is then moved further in a downward direction (Fig. 2) by reciprocating the long handles 33, a man working at each side of the machine. The pawls 35 transmit the movement to the ratchet wheels 30 and shaft 26 during the pressure part of the reciprocation that is to say, in the direction of the arrow in Fig. 2, and pawls 31, as before prevent any upward movement of the press head. After substantial compression of the rags it may be found necessary to add further rags and the press head is retracted by releasing pawl 35, moving pawl 31 to its other position, and turning a short handle 32. On reaching the uppermost position the press head is retained there by engagement of the lug 31a with the ratchet 30 and the top 12 may be retracted and more rags fed to the machine. The top and press head are then returned to the pressing position and further compression of the rags carried out as before. If necessary by continuous repetition of the process a bale of sufficient size and sufficiently compressed is obtained. The wires 49 are then fed over the bale, through slots 19a and 37a, and the bale bound, by means of a wire-twisting device.

To remove the bale it is merely necessary to lift the handle 46a and by applying foot pressure on the rest 42 and pulling rearwardly on the hand rail 41 the truck is tilted and released and can be rolled away on its wheels 40 to any location (Fig. 4).

The baling machine, of course, could be arranged for power operation. Fig. 6 shows, diagrammatically, a baling machine in which the drive to the shaft 26 is provided by an electric motor 50. Fig. 7 shows, diagrammatically, a baling machine in which the press head is operated by a ram 51, subject to fluid pressure such as that of compressed air or oil.

The principal advantage of a baling machine constructed in accordance with the present invention is that the bale is quickly and easily removed and then is mobile. In previous machines it was often necessary to exert considerable effort and to use mechanical aids such as grapples to remove the bale from the machine, which then had to be bound and loaded onto transport means for removal. A subsidiary advantage is that the bale can be wired before removal from the baling machine.

This invention is to be broadly construed and not limited except by the character of the claims appended hereto.

What we claim is:

1. A baling machine comprising in combination a hollow body having one open side, a mobile truck separable from said body and mounted for movement independently of and separately from said body, an upright and a base forming part of said mobile truck, said upright being of a size and shape to cover said open side and said base being of a size and shape to fit within the lower portion of said body, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment of said mobile truck from said body whereby a pressed bale may be removed from said body whilst still supported by said mobile truck, and a press head operably associated with said body and movable therein for compressing the material into a bale.

2. A baling machine comprising in combination a hollow body having one open side, a mobile truck separable from said body and mounted for movement independently of and separately from said body, an upright and a base forming part of said mobile truck, said upright being of a size and shape to cover said open side and said base being of a size and shape to fit within the lower portion of said body, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment of said mobile truck from said body whereby a pressed bale may be removed from said body whilst still supported by said mobile truck and a vertically operable press head movable in said body for compressing said material into a bale.

3. A baling machine comprising in combination a hollow body having one open side, a mobile truck separable from said body and mounted for movement independently of and separately from said body, an upright and a base forming part of said mobile truck, said upright being of a size and shape to cover said open side and said base being of a size and shape to fit within the lower portion of said body, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment of said mobile truck from said body whereby a pressed bale may be removed from said body whilst still supported by said mobile truck, a horizontally retractable top for said body, and a vertically operable press head carried by said top and adapted to move in said body for compressing said material into a bale.

4. A baling machine comprising in combination a hollow body having one open side, a mobile truck separable from said body and mounted for movement independently of and separately from said body, an upright and a base forming part of said mobile truck, said upright being of a size and shape to cover said open side and said base being of a size and shape to fit within the lower portion of said body, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment of said mobile truck from said body whereby a pressed bale may be removed from said body whilst still supported by said mobile truck, a horizontally retractable top for said body, detents for holding said top and said truck in position in said body, a vertically operable press head carried by said top and means for activating said press head for movement in said body to compress said material into a bale.

5. A baling machine comprising in combination a hollow body having one open side, a mobile truck, an upright and a base forming part of said mobile truck, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment from said body whereby a pressed bale may be removed from said body whilst still supported by said mobile truck, a horizontally retractable top for said body, detents for holding said top and said truck in position in said body, a vertically operable press head carried by said top, said truck having at least one truck supporting wheel at the lower end of said upright, said wheel being in non-supporting position when said truck is attached to said body, and means for activating said press head to compress said material into a bale.

6. A baling machine comprising in combination a hollow body having one open side, a mobile truck, an upright and a base forming part of said mobile truck, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment from said body whereby a pressed bale may be removed from said body whilst still supported by said mobile truck, a horizontally retractable top for said body and a vertically operable press head, vertical rack means associated with said press head, pinion means carried by said horizontally retractable top and in operative association with said rack, means associated with said rack and said pinion whereby said press head may be raised and lowered, within said body, through the operable connection of said rack and said pinion, for compressing said material into a bale when said press head is lowered.

7. A baling machine as set out in claim 6 in which the edges of said body substantially define a rectangular parallelepiped, said mobile truck when in position forming a side and base thereof.

8. A baling machine as set out in claim 7 in which said mobile truck is provided with two wheels and a handle on said upright, said wheels being secured to said upright adjacent the base and said handle being located transversely of said upright in the region of the other end thereof, locking means for the truck being provided at the lower end of the body and adapted to secure the truck in position within the body.

References Cited in the file of this patent

UNITED STATES PATENTS

| | | |
|---|---|---|
| 56,456 | Seeberger et al. | July 17, 1866 |
| 255,091 | Smith | Mar. 14, 1882 |
| 290,264 | Perkins | Dec. 18, 1883 |
| 422,602 | Loflin | Mar. 4, 1890 |
| 1,038,248 | Wenzelman | Sept. 10, 1912 |
| 1,112,723 | Schick | Oct. 6, 1914 |
| 1,220,870 | Marx | Mar. 27, 1917 |
| 1,475,842 | McIlwaine | Nov. 27, 1923 |
| 1,736,338 | Brown | Nov. 27, 1929 |
| 1,822,923 | Duerr | Sept. 15, 1931 |
| 2,576,776 | Cavagnaro et al. | Nov. 27, 1951 |

FOREIGN PATENTS

| | | |
|---|---|---|
| 91,952 | Austria | Mar. 23, 1923 |
| 413,567 | Great Britain | July 19, 1934 |